March 11, 1952 S. ROSIN 2,588,414
ASPHERICAL CORRECTOR LENS FOR OPTICAL SYSTEMS
Filed Sept. 11, 1946 2 SHEETS—SHEET 1
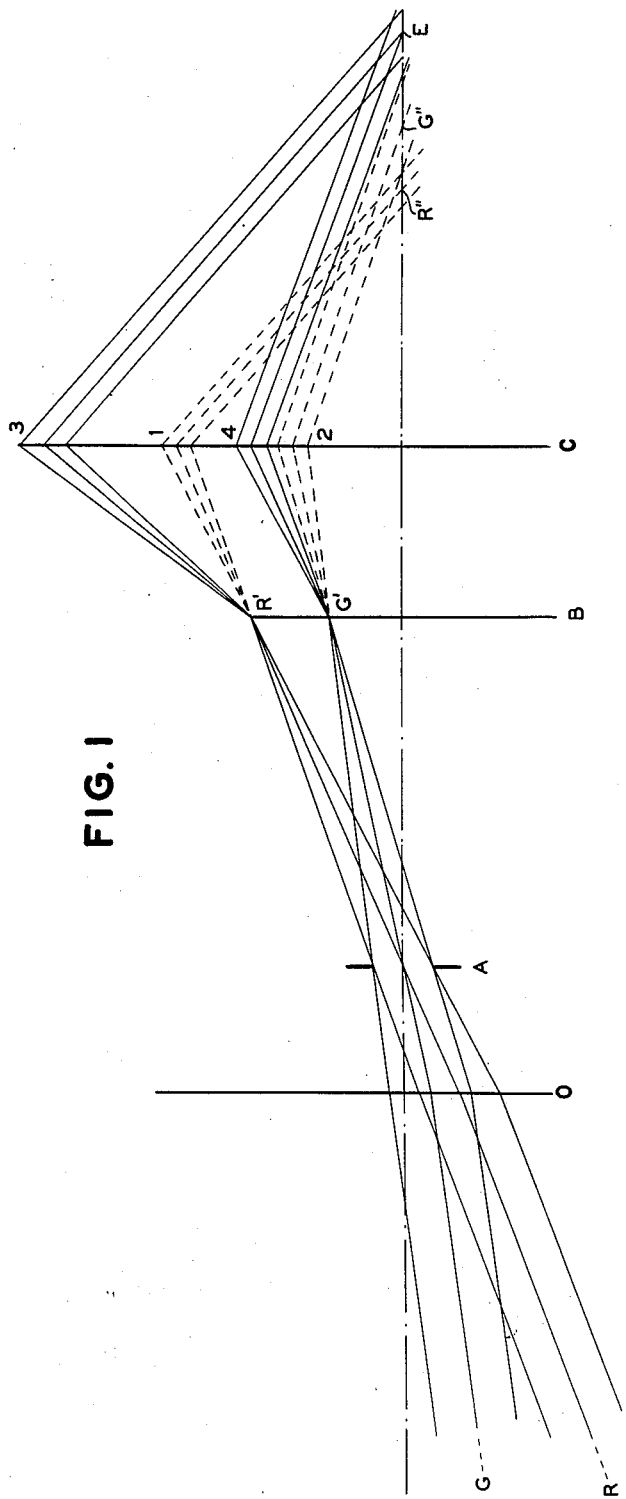
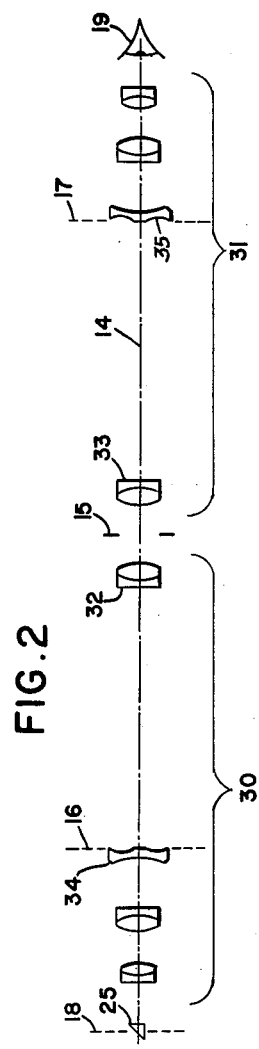
INVENTOR
SEYMOUR ROSIN
BY Pennie, Edmonds,
Marton and Barrows
ATTORNEYS March 11, 1952  S. ROSIN  2,588,414
ASPHERICAL CORRECTOR LENS FOR OPTICAL SYSTEMS
Filed Sept. 11, 1946  2 SHEETS—SHEET 2
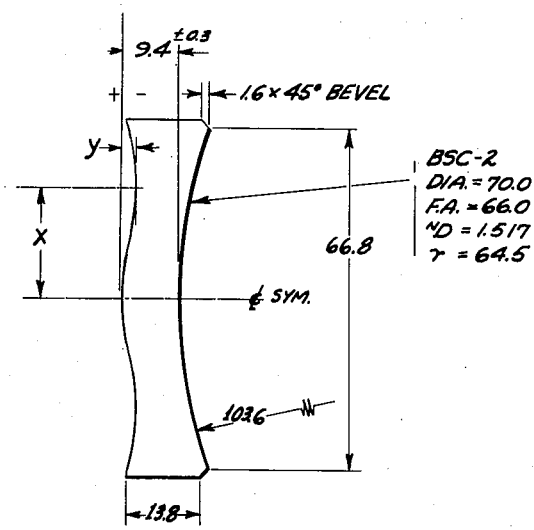
FIG.8
FIG.8a
| x | y |
|---|---|
| 2.0 | -.00563 |
| 4.0 | -.02220 |
| 6.0 | -.04873 |
| 8.0 | -.08362 |
| 10.0 | -.12462 |
| 12.0 | -.16880 |
| 14.0 | -.21258 |
| 16.0 | -.25175 |
| 18.0 | -.28142 |
| 20.0 | -.29599 |
| 22.0 | -.28921 |
| 24.0 | -.25412 |
| 26.0 | -.18307 |
| 28.0 | -.06766 |
| 29.0 | +.00940 |
| 30.0 | +.10114 |
| 31.0 | +.20871 |
| 32.0 | +.33338 |
| 32.5 | +.40257 |
| 33.0 | +.47634 |
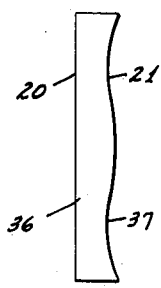
FIG.3
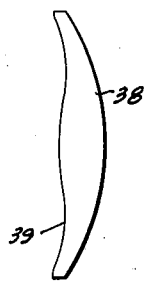
FIG.4
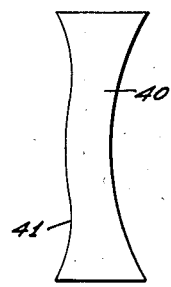
FIG.5
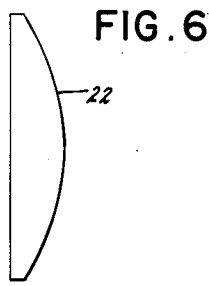
FIG.6
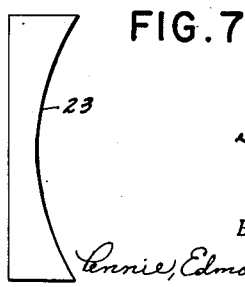
FIG.7
SEYMOUR ROSIN,
INVENTOR.
BY
Pennie, Edmonds, Morton and Barrows
ATTORNEY.

Patented Mar. 11, 1952

2,588,414

UNITED STATES PATENT OFFICE 2,588,414

ASPHERICAL CORRECTOR LENS FOR OPTICAL SYSTEMS

Seymour Rosin, New York, N. Y., assignor to Farrand Optical Co., Inc., a corporation of New York Application September 11, 1946, Serial No. 696,237

4 Claims. (Cl. 88—32)

This invention relates to corrector lenses for visual optical instruments such as telescopes, or periscopes consisting of two or more telescopes facing each other, especially to those having a wide field of view such as 60° or more. It relates more particularly to corrector lenses serving to correct the spherical aberration of the entrance and exit pupils of such instruments. A wide field of view is important for military purposes, so that a fast moving target may more quickly be seen. Such periscopes may be equipped with moving mirrors or prisms in front thereof so that a considerable portion of the celestial sphere may be scanned rapidly.

The images formed by lenses and lens systems having spherical surfaces, for example as used in telescopes and periscopes, are subject to the well-known aberrations such as spherical aberration, coma, astigmatism, etc. The designer of such systems skilled in the art seeks to minimize the effect of these aberrations upon the final image of the object to be viewed with the instrument.

In addition however to the primary set of images formed by such an optical system, i. e. the images of objects external to the system, culminating in the image viewed by the eye of the observer, there is a secondary or "aperture" set of images. These aperture images are images of elements within the system, and include among others the exit and entrance pupils of the system.

These concepts of "entrance pupil" and "exit pupil" are well known in the art. If the diaphragm, or lens ring most effective in restricting the bundle of rays through the instrument is designated the "aperture stop," then the entrance pupil is the image of the aperture stop formed by optical elements of the instrument between it and the object space, and the exit pupil is its image formed by those optical elements of the system between it and the image space. The entrance and exit pupils are important because of the control they exert over the amount and distribution of light entering and leaving the system.

In practice the difficulties involved in correcting a system so as to eliminate aberrations from the final image of the external object to be viewed preclude consideration of aberrations of the aperture or pupillary images, and it is customary only to insure that they have the proper sizes and positions. Correction of the optical system for its primary function does not eliminate aberrations from the pupillary images because the object and image distances taken into consideration in designing the system for its primary function are widely different from the object (aperture stop) and image (pupil) distance of the pupil system. The pupillary images of visual instruments are, therefore, commonly afflicted with various aberrations, notably with longitudinal spherical aberration.

Spherical aberration of the entrance pupil increases the necessary size of the scanning device employed at the entrance pupil to change the line of sight of the instrument so as to scan the object space outside the field of the instrument. The use of such scanning devices is important in such instruments as periscopes which cannot be directed bodily at the object to be viewed, and the scanning device should be as compact as possible.

When there is a residual spherical aberration of the exit pupil, it is not possible for the observer to position his eye at any one place near the eyepiece and receive the central, intermediate and edge portions of the field, as such portions of the bundle are not brought to a focus at a single locus, but are spread out along the optical axis. With the eye in a certain position, the intermediate field appears as a ring which is either black or reduced in intensity. If the eye is displaced very slightly to one side or the other, this ring has a tendency to open up and assume the shape of an eccentric spot or "kidney bean." These spots are well known and a source of considerable annoyance and trouble in wide field systems, resulting in a large reduction in their efficiency of use.

The objects of the invention include the reduction or elimination of the spherical aberration of the entrance and exit pupils of visual optical instruments, without affecting the primary function of such instruments in producing a corrected final image of the object under observation. This is accomplished separately as to each pupil by providing a corrector lens located between the aperture stop of the instrument and the pupil in question. The corrector lens is aspherical and has at each zone of its surface a curvature which, in combination with the index of the glass of which it is composed, compensates for the spherical aberration introduced into the various chief rays passing through the center of the aperture stop and the pupil in question, by the lenses of the system which lie between the aperture stop and the pupil in question. The chief rays are thus brought to a common point of intersection on the axis of the system at the center of each pupil. The entrance and exit pupils, which in the absence of the corrector lens of the present invention are not clearly defined, are thus brought to focus at a single locus. The corrector lens in each case is positioned at or adjacent an image plane of the system for the object under observation with it, whereby the corrector lens has little or no effect on the quality of the image seen through the instrument, but a major effect on the pupil in correcting it. In the case of a telescopic system these image planes will be a focal plane between the aperture stop and the object space and a focal plane between the aperture stop and the image space. Typically they will be the secondary focal plane of the objective and the primary focal plane of the eyepiece. In all cases they will be focal planes in the sense that they will be planes at which the images of the objects observed with the instrument will be in focus.

The corrector lens may be employed for either the entrance pupil or for the exit pupil, or for both of them. Also one surface of the corrector lens may have a reticle pattern, such as crossed lines, concentric circles, or the like.

For further details of the invention reference may be made to the drawings wherein Fig. 1 is a ray diagram illustrating the occurrence of spherical aberration of the exit pupil of an optical system (as distinguished from spherical aberration of the final image of the object being viewed with the system) and illustrating how the corrector lens of the present invention eliminates such spherical aberration of the exit pupil.

Fig. 2 is a schematic view of a wide angle optical instrument for visual use having one corrector lens for elimination of the spherical aberration of the entrance pupil and a second corrector lens for elimination of the spherical aberration of the exit pupil.

Figs. 3 to 8 are schematic side views in elevation illustrating various types of corrector lenses each having one side aspherical.

Fig. 8a is a table of numerical data for a particular corrector lens of Fig. 8. The dimensions in Figs. 8 and 8a are in millimeters.

In Fig. 1 is shown an optical system including image forming means such as an objective lens or lens system at O, an aperture stop A, a corrector lens B and an eyepiece C. The objective, corrector and eyepiece are shown diagrammatically as lines representative of their principal planes, the lenses being assumed to be thin so that they can be represented each by a single principal plane. The objective, corrector and eyepiece may however, and typically will be, thick lenses or combinations of lenses. Whether thick or thin the objective and eyepiece will have primary and secondary focal planes, at which they will form images of distant objects, and they will form images of objects at finite distances at image planes which are ascertainable by the usual methods of geometrical optics. The following description of the invention therefore applies to systems embodying thick as well as thin lenses.

Fig. 1 illustrates the use of such an objective and eyepiece as a telescopic system, forming at infinity on the right an image of an object at infinity on the left. In such use the objective will form an image of an infinitely distant object at its secondary focal plane, which will coincide with the primary focal plane of the eyepiece C. The final image to be formed by the system as a whole is to be viewed by an observer with an eye placed on the optical axis of the system at the exit pupil thereof to the right of the eyepiece.

Two laterally separated points R and G in the object may be considered to show the operation of the corrector lens of the present invention. Bundles of parallel light from these points R and G fall on the objective O and are refracted by it to form image points R' and G' in the primary focal plane of the eyepiece C. In order for light rays from the points R and G in the object to reach the image plane at the primary focal plane of the eyepiece C they must pass through the aperture stop A. Thus the aperture stop A becomes the common base of the cones of light which form the images R' and G' in the primary focal plane of the eyepiece C of points R and G in the object. The apices of the cones are the image points R' and G', and the cones, when traced back through the objective O, are converted into cylindrical bundles which originate in points R and G and which limit the light from these points which contributes to the images at R' and G'. The points R' and G' may be perfect reproductions of the points R and G in the object, assuming that the aberrations of the system preceding the eyepiece have been eliminated with respect to distant objects and images thereof such as R' and G'. This does not imply, however, that aberrations have been eliminated with respect to planes which are not conjugate with the plane in which R' and G' lie.

In the absence of the corrector lens B, the rays converging upon the image points R' and G proceed undeviated until they reach the eyepiece C. In Fig. 1 this is indicated by dashed lines representative of the central or "chief" ray and of the marginal rays of each cone. The chief rays of course pass through the center of the aperture stop A.

After refraction through the eyepiece, the cones proceeding from R' and G' are converted into cylindrical bundles, since R' and G' lie in the primary focal plane of the eyepiece, the final image being formed at infinity. The chief rays of these bundles cross the axis of the system at R'' and G''. R'' and G'' of course are not images of R' and G'. Rather they are images of, or points conjugate with, the center of the aperture stop A. Their separation along the optical axis represents the spherical aberration of the system with respect to the exit pupil. The bundle crossing the axis about the point R'' has been refracted at an outer zone 1 of the eyepiece and the bundle about G'' has been refracted at an inner zone 2. This spherical aberration of the exit pupil is present in spite of the fact that there is no spherical aberration with respect to the final images of the original object points R and G. Thus, if an eye is placed at R'' it will see a perfect image of R, but it will not see an image of G. Both images exist simultaneously, but a single eye cannot see them simultaneously.

If a corrector lens is placed in the plane of the image points R' and G', it may be so curved at the zone of R' as to deviate the cone of rays proceeding from R' toward the eyepiece, causing these rays to be refracted through zone 3 of the eyepiece and to intersect the axis of the system symmetrically about the point E. At the zone of G' the curvature of the corrector lens may be such that the rays of the cone diverging from G' are refracted through zone 4 of the eyepiece and likewise intersect the axis of the system symmetrically about the same point E. The fact that the chief rays of the two cylindrical bundles (to the right of the eyepiece) both intersect the axis in the same point means that the spherical aberration of the exit pupil of the instrument has been eliminated. An eye placed with its entrance pupil at E will then simultaneously see perfect images of the object points R and G. Since the corrector lens B is located at an image plane of the primary image system, which for distant objects coincides with the secondary focal plane of the objective and the primary focal plane of the eyepiece, it has little or no effect on the perfection of the primary image which is finally observed by the eye placed at E. For this reason the cones proceeding from the points R' and G' toward the eyepiece are of the same aperture whether the corrector lens B is present or not.

The applicability of the invention is not restricted to telescopic systems, however. If the system is being used at finite conjugates, the image plane in which R' and G' lie may depart from the secondary focal plane of the objective and it may depart slightly from the primary focal plane of the eyepiece, but if the corrector lens B is placed at this new image plane the spherical aberration of the exit pupil will be eliminated as before without effect upon the quality of the final image.

Fig. 2 is a schematic view of a wide angle optical instrument for visual use having two telescopes 30, 31 facing each other. The optical system thereof has an optical axis 14, a central aperture stop 15, (which may be the lens ring of one of the erector lenses 32, 33), a focal plane 16 between the aperture stop and the object space, a focal plane at 17 between the aperture stop and the image space, an entrance pupil at 18 and an exit pupil at 19 at the eye position. A scanning device 25 in the form of a prism is shown filling the entrance pupil 18. This scanning device permits viewing portions of the object space outside the field of the instrument.

The target or object is presumed to be somewhere to the left of Figure 2. Images of the object are produced at or near the focal planes 16 and 17. The final image is viewed by an eye situated at 19.

As above stated, normally a designer skilled in the art attempts to obtain a clear and distinct final image free from aberrations such as spherical aberration, coma, astigmatism, field curvature, distortion, chromatic aberration, etc. The elimination of these aberrations depends on the kind of glass, curvature and thicknesses of the several lenses and their axial location. However, lenses placed at or close to the focal planes 16 and 17 have little or no effect on any of the aberrations of the primary system, with the possible exception of field curvature, with the caution that the proper chief rays be chosen for the spherical aberration calculation.

According to the invention, one places, at or near a focal plane, a lens component, hereinafter referred to as the corrector lens, correcting the spherical aberration of the pupil in question. As explained above, the nature of this lens has only a minor effect on the quality of the image seen through the instrument, but has a major effect on the pupil. It may be stated parenthetically that for this reason the optical quality required of the corrector lens is low and that therefore manufacturing problems are of relatively small concern. The lens form is calculated by methods well known to those skilled in the art, so that the optical path lengths of the several chief rays passing through the corrector lens are adjusted to cause them to arrive at one and the same place on the axis of the instrument, at the selected pupil position. Or, alternatively, the form of the surface is so calculated, that chief or principal rays passing through it are deflected by just the amounts necessary to neutralize the spherical aberration impressed on the pupil by the other components of the system.

The numerical values for the corrector lenses employed do not form a part of the present invention, since they will depend entirely upon the constants of the system being corrected. The form of the corrector lens may be computed by the usual methods of ray tracing. For example, with a given optical system the positions of the aperture stop, entrance, and exit pupils and focal planes for the primary set of images are known. If the system is to be used at finite conjugates the important planes are not the focal planes for objects at infinity but the planes at which the images of objects at finite distances are focused, and the two sets of planes will differ. The location of the latter set will be known, however. Rays corresponding to various representative extra-axial object positions are traced from the aperture stop to the focal plane or image plane at which the corrector lens is to be placed and from the desired pupil position to this same plane. In the presence of spherical aberration of the pupil these rays will be found to be discontinuous in this plane, but the heights of incidence will be known and also the required changes in the direction of the rays. This provides the information necessary to determine the contour of the surface required to produce such changes at such heights.

In Fig. 2 a corrector lens 34 may be placed at 16 to correct the entrance pupil aberration or a corrector lens 35 at 17 to correct the exit pupil aberration, or both may be used. This corrector lens will in general have one or more aspherical surfaces, although a thick meniscus may also serve. Since these elements are in or near the focal plane, they may also bear reticles, either on the side where the correction is located, or on the other side.

Fig. 3 shows one form of corrector lens 36 where a parallel sided reticle element has been modified with a zone 37 of reduced thickness to give the pupil correction. Side 20 contains the reticle pattern and side 21 is the aspherical surface, formerly plane, which has been suitably modified.

Fig. 4 shows an element 38, formerly plano-convex and serving as a collective lens for containing the chief rays inside a specified tube diameter (as is well known in the art) in which the plane face has been similarly modified with a zone 39 of reduced thickness.

Fig. 5 shows a dispersive element 40 also so treated on its formerly plane face with a reduced zone 41.

It is not necessary to confine the correction to surfaces formerly plane. In Figs. 6 and 7, surfaces 22 and 23 are aspherical and combine the functions of collector or disperser with the corrector function. All of these, together with others not mentioned but obvious, serve to achieve the desired result of correcting the residual pupillary spherical aberration without affecting appreciably the primary design and function of the optical system to give satisfactory imagery. The one feature common to these is that the corrector lens is at or near, i. e. adjacent, a focal plane. Finally, Figure 8 shows the form of an actual corrector lens of the nature of Figure 5 with actual tabulated values (Fig 8a) of the aspherical surface as calculated to suit the instrument for which is was designated.

Of course if a specified spherical aberration is desired, the corrector lens design could be modified to produce it. Also, the various corrector lenses may face in either direction, but their correction should be proper for the direction in which they face and may be slightly different for reversed positions.

It will be apparent that various modifications may be made in the invention without departing from the spirit of the following claims.

I claim:

1. In a telescopic optical system having an objective and an eyepiece, said objective and eyepiece being corrected to minimize the aberrations in the images of distant objects produced by the system, said system being afflicted with spherical aberration of the exit pupil thereof, a corrector lens located at or adjacent the primary focal plane of the eyepiece, said corrector lens having an aspherical surface figured to correct the spherical aberration of the exit pupil caused by the lens elements between the aperture stop of the system and the exit pupil.

2. In an optical system including a plurality of lenses symmetric in a common optical axis and an aperture stop located intermediate the first and last of the said lenses, which aperture stop may be formed by one of the said lenses intermediate the first and last thereof, a corrector lens located adjacent a focal plane of the system intermediate the first and last of said lenses at which the system focuses images of objects external to the system, said corrector lens having an aspherical surface adapted to correct the spherical aberration of the image of the said aperture stop produced by the lenses on the side of the aperture stop on which the said focal plane lies.

3. In an optical system including a plurality of lenses symmetric in a common optical axis and an aperture stop located intermediate the first and last of the said lenses, which aperture stop may be formed by one of the said lenses intermediate the first and last thereof, said system being designed to operate at finite conjugates, a corrector lens located adjacent an image plane of the system for objects at such finite conjugates, said image plane lying intermediate the first and last lenses of the system, said corrector lens having an aspherical surface adapted to correct the spherical aberration of the image of said aperture stop produced by the lenses on the side of the aperture stop on which the said image plane lies.

4. In a telescopic optical instrument equipped with a scanning device located at the entrance pupil of the instrument, said scanning device being adapted to scan the object space outside the true field of the instrument, a corrector lens located at a focal plane of the instrument between the entrance pupil and the aperture stop of the instrument, said corrector lens having an aspherical surface adapted to correct the spherical aberration of the entrance pupil introduced into the said pupil by the lenses between the aperture stop and the scanning device.

SEYMOUR ROSIN.

REFERENCES CITED

The following references are of record in the file of this patent:

UNITED STATES PATENTS

| Number | Name | Date |
| --- | --- | --- |
| 540,122 | Taylor | May 28, 1895 |
| 1,445,284 | Bell et al. | Feb. 13, 1923 |
| 1,468,762 | Taylor et al. | Sept. 25, 1923 |
| 2,068,829 | Van Albada | Jan. 26, 1937 |
| 2,170,979 | Straubel | Aug. 29, 1939 |
| 2,234,716 | Wood | Mar. 11, 1941 |
| 2,398,276 | Altman | Apr. 9, 1946 |

FOREIGN PATENTS

| Number | Country | Date |
| --- | --- | --- |
| 384,879 | Germany | Nov. 9, 1923 |